United States Patent [19]

Harwath

[11] Patent Number: 4,856,553
[45] Date of Patent: Aug. 15, 1989

[54] PUMP WITH VALVE ADJUSTING SCREW
[75] Inventor: Frank L. Harwath, Rockford, Ill.
[73] Assignee: Suntec Industries Incorporated, Rockford, Ill.
[21] Appl. No.: 238,416
[22] Filed: Aug. 31, 1988
[51] Int. Cl.[4] .............................................. F16K 17/06
[52] U.S. Cl. ..................................... 137/509; 137/540
[58] Field of Search ................. 137/509, 540; 411/172
[56] References Cited

U.S. PATENT DOCUMENTS

| | | | |
|---|---|---|---|
| 2,258,845 | 10/1941 | Burke | 411/172 |
| 3,207,179 | 9/1965 | Klagues | 137/540 X |
| 3,566,901 | 3/1971 | Swedberg | 137/87 |
| 4,391,580 | 7/1983 | Hunsberger | 431/1 |

Primary Examiner—Robert G. Nilson
Attorney, Agent, or Firm—Leydig, Voit & Mayer

[57] ABSTRACT

The regulating valve of a gear pump for an oil burner is urged to a closed position by a spring-loaded plunger. An adjusting screw is associated with the plunger and, when turned, causes the plunger to shift longitudinally so as to adjust the spring force applied to the valve. The screw is threadably received within a nut which is formed integrally with a sleeve. A pump inlet fitting extends through the sleeve to fasten the sleeve to the body of the pump. The inlet fitting and the sleeve coact to prevent rotation of the nut when the adjusting screw is turned.

4 Claims, 1 Drawing Sheet

PUMP WITH VALVE ADJUSTING SCREW

BACKGROUND OF THE INVENTION

This invention relates generally to a pump and, more particularly, to an oil burner pump having a regulating valve for delivering fuel to an oil burner. A pump of this general type is disclosed in Swedberg U.S. Pat. No. 3,566,901.

In such a pump, the fuel, when pressurized, forces the regulating valve open against the force of a spring which snaps the valve closed when the pump shuts off. The force exerted on the valve by the spring may be increased or decreased by turning an adjusting screw to change the compression of the spring. In the pump of the Swedberg patent, the adjusting screw is threaded into a cap fitting which, in turn, is located in a bore in the pump body. The bore for the adjusting screw is coaxial with a bore which receives the valve and which is internally threaded so as to receive the cap fitting.

In prior pumps of the above type, the inlet port which is primarily used is located in the cover of the pump. Whenever it is necessary to remove the cover to service the pump, it is necessary to first disconnect the inlet or supply line from the inlet port.

In order to avoid the need for disconnecting the inlet line, the pump of the present invention includes an inlet bore formed in the pump body and extending in closely spaced and parallel relation to the bore for the regulating valve. Because of the closely spaced relation between the inlet bore and the valve bore, difficulty has been encountered in incorporating a valve adjusting screw into the pump body.

SUMMARY OF THE INVENTION

The general aim of the present invention is to provide a new and improved pump of the foregoing type in which the inlet bore is located in the pump body in closely spaced relation with the regulating valve bore and in which an adjusting screw for adjusting the regulating valve is supported on the outside of the pump body in a unique manner permitting a closely spaced relation between the two bores.

A more detailed object of the invention is to achieve the foregoing through the provision of a nut which receives the adjusting screw and which is uniquely supported from the pump body so as to avoid the need of threading the valve bore to accommodate the adjusting screw.

The invention also resides in the novel use of an inlet port fitting to enable the nut to be attached to the pump body.

These and other objects and advantages of the invention will become more apparent from the following detailed description when taken in conjunction with the accompanying drawings.

DETAILED DESCRIPTION OF THE PREFERRED EMBODIMENT

Figure 1:
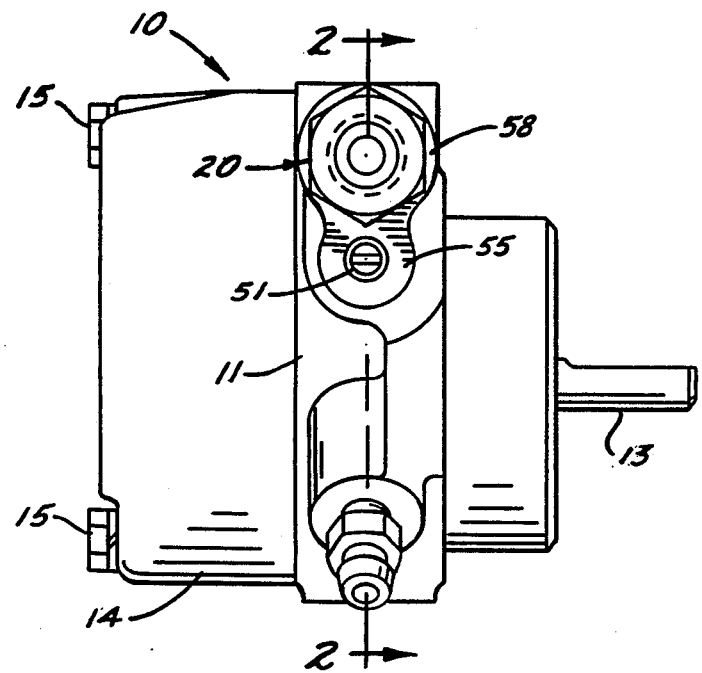
FIG. 1 is a side elevational view of a new and improved pump incorporating the unique features of the present invention.
Figure 3:
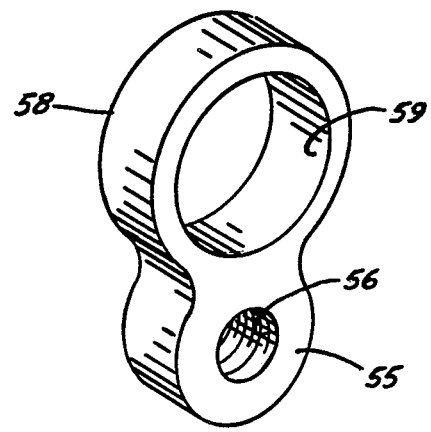
FIG. 3 is a perspective view of the nut for the adjusting screw.

For purposes of illustration, the invention has been shown in the drawings as embodied in a gear pump 10 of the type which is widely used for delivering fuel oil from a tank (not shown) and supplying the fuel under pressure to an oil burner (not shown). The constructional and operational features of the pump from a hydraulic standpoint are substantially identical to those of the pump disclosed in Hunsberger et al U.S. Pat. No. 4,391,580 to which reference is made for a detailed explanation of the hydraulic structure and operation of the pump.

Briefly, the pump 10 includes a body 11 formed by a casting having ears 12 for mounting the pump. A drive shaft 13 extends through the body 11 and is rotatably supported in the body. The outer end portion of the shaft projects outwardly from the outer end of the body and is adapted to be connected to a drive motor (not shown). Disposed in face-to-face relation with the other end of the body 11 is a cover or housing 14 which is detachably secured to the body by screws 15.

Fuel oil from the tank is delivered to the pump 10 via an inlet line (not shown) adapted to be fastened to an inlet fitting 20. The inlet fitting includes a cylindrical outer portion 21 located outside of the body 11 and further includes a threaded inner portion 22 which is screwed into an internally threaded and longitudinally extending hole or bore 23 formed in the body. Oil which is admitted into the inlet bore 23 by way of the fitting 20 flows through a passage 24 to a gear set (not shown) located in the housing 14 and adapted to be driven by the shaft 13. Pressurized oil from the gear set is supplied by way of passages 25 and 26 to a longitudinally extending bore 27 which is formed completely through the body 11. The bore 27 is located in parallel relation with the bore 23.

Telescoped slidably into the bore 27 is a main regulating valve member 30 which is generally in the shape of a cylindrical sleeve. One end of the sleeve is closed and carries a valve closure 31. The latter normally engages a valve seat 32 having a passage 33 therein and formed as an integral part of a threaded outlet fitting 34 adapted to be connected to the oil burner. The fitting 34 is threaded into the bore 27.

Figure 2:
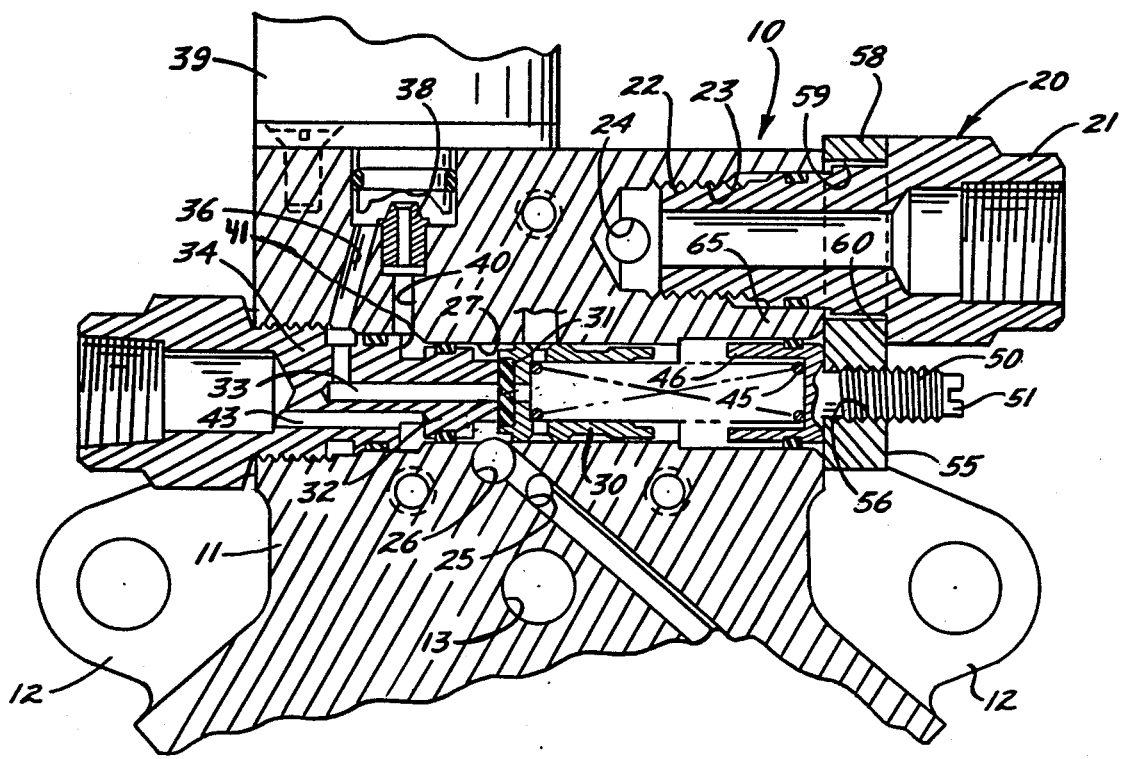
FIG. 2 is an enlarged fragmentary cross-section taken substantially along the line 2—2 of FIG. 1.

When the valve member 30 is located in a closed position as shown in FIG. 2, the passage 33 is closed by the valve closure 31. When the oil is pressurized by the pump 10, the pressure forces the valve member 30 to the right to effect opening of the passage 33. Oil from the passage 26 then flows through the passage 33 to a passage 36. If a valve 38 operated by a solenoid 39 is open, oil then flows from the passage 36 through a passage 40 and then to an annular groove 41 formed around the valve seat 32 and located in the bore 27. From the groove 41, oil flows through a passage 43 in the fitting 34 and then out of the fitting to the burner.

The valve member 30 is biased toward its closed position with respect to the passage 33 by a coiled compression spring 45. One end of the spring engages the closed end of the valve member 30 while the other end of the spring engages a spring seat 46. The latter is in the form of a generally cup-shaped plunger which is received slidably in the bore 27.

It is important that the valve member 30 quickly open when the output pressure of the gear set increases to a predetermined magnitude and that the valve member quickly snaps closed when the pressure falls to a given magnitude. In order to achieve this, it is necessary to be able to adjust the force applied to the valve member 30 by the spring 45.

According to the present invention, the spring force is adjusted by turning an adjusting screw 50 which is uniquely supported on the outside of the pump body 11. By virtue of the manner in which the adjusting screw is supported, there is no need of threading that portion of the bore 27 which receives the spring plunger 46. As will become apparent subsequently, the absence of threads in the plunger-receiving portion of the bore 27 enables the inlet bore 23 to be located closely adjacent the bore 27.

More specifically, the adjusting screw 50 is in the form of a threaded shank which is formed integrally with the closed end of the plunger 46 and which projects axially from the plunger to a location outside of the body 11. The outer end of the screw is formed with a slotted driving head 51.

In carrying out the invention, the screw 50 is threadably received in a nut 55 which is uniquely supported by attaching means formed by the inlet fitting 20. Herein, the nut 55 is formed with a bore 56 which is suitably threaded to receive the screw 50. A sleeve 58 is formed integrally with and projects radially from the nut 55 and is formed with a large bore 59.

As shown in FIG. 2, the inlet fitting 20 extends through the bore 59 in the sleeve 58 and is formed with a shoulder 60 which clamps the sleeve against the pump body 11 when the fitting is tightened. With the sleeve so located, the bore 56 of the nut 55 is aligned with the bore 27 in the body 11 for purposes of receiving the screw 50. When the screw is turned in the nut 55, the plunger 46 is shifted inwardly or outwardly in the bore 27 to increase or decrease the force applied by the spring 45 to the valve member 30. Because the nut 55 is anchored to the body 11 by means of the sleeve 58 and the inlet fitting 20, the nut is held against rotation during turning of the screw.

As a result of the screw 50 coacting with a nut 55 which is located outside of the pump body 11, there is no need to thread the bore 27 and place a cap fitting in the bore as is the case with the pump disclosed in Swedberg U.S. Pat. No. 3,566,901. Thus, the wall 65 between the bores 23 and 27 may be very thin (e.g., in the neighborhood of 0.075"). This enables the inlet fitting 20 to be fastened to the body 11 of the pump 10 instead of to the housing 14 so as to eliminate the need for disconnecting the inlet line when the housing is removed to permit servicing of the pump.

I claim:

1. A pump having a body with a passage therein, a valve movable between open and closed positions with respect to said passage, a compression spring acting on said valve and biasing said valve toward one of said positions, and selectively adjustable mechanism for changing the force applied to said valve by said spring, said mechanism comprising a screw which is operable when turned to change the compression of said spring, said screw having an elongated externally threaded shank, a nut having a bore threadably receiving said shank, and means joined to and projecting radially from said nut and connected to said body so as to prevent rotation of said nut when said screw is turned, said means comprising a sleeve joined to said nut and having a bore spaced radially from the bore of the nut, and attaching means extending through the bore of said sleeve and connected releasably to said body.

2. A pump as defined in claim 1 in which said nut and said sleeve are integral with one another.

3. A pump as defined in claim 1 in which said body is formed with an inlet passage defined at least in part by a threaded hole, said attaching means comprising an inlet fitting extending through the bore in said sleeve and threaded into said hole.

4. An oil burner pump having a body with an inlet and outlet, said inlet having a threaded hole, an inlet fitting threaded into said hole and adapted to be connected to a supply of oil, an elongated bore formed in said body, a valve movable longitudinally within said bore between open and closed positions with respect to said outlet, a compression spring disposed in said bore and acting on said valve to bias said valve toward said closed position, a plunger disposed in said bore and adjustable longitudinally of the bore to change the force applied to said valve by said spring, and selectively adjustable means for effecting longitudinal adjustment of said plunger, said means comprising an elongated externally threaded shank connected to one end of said plunger and projecting out of said body, a nut having a threaded bore threadably receiving said shank, a sleeve joined to said nut and having a bore spaced radially from the bore of said nut, said inlet fitting extending through the bore of said sleeve and attaching said nut to said body so as to prevent said nut from rotating when said screw is turned to adjust said plunger.

* * * * *